(12) United States Patent
Relan et al.

(10) Patent No.: US 7,956,929 B2
(45) Date of Patent: Jun. 7, 2011

(54) VIDEO BACKGROUND SUBTRACTOR SYSTEM

(75) Inventors: Sandeep Kumar Relan, Bangalore (IN); Brajabandhu Mishra, Orissa (IN); Rajendra Kumar Khare, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1432 days.

(21) Appl. No.: 11/392,902

(22) Filed: Mar. 30, 2006

(65) Prior Publication Data

US 2007/0097268 A1    May 3, 2007

Related U.S. Application Data

(60) Provisional application No. 60/731,254, filed on Oct. 31, 2005.

(51) Int. Cl.
  *H04N 5/14*  (2006.01)
  *H04N 9/64*  (2006.01)
  *H04N 9/74*  (2006.01)
(52) U.S. Cl. ......... 348/576; 348/584; 348/589; 348/701
(58) Field of Classification Search .................. 348/576, 348/584–587, 589–593, 700, 701, 169; 345/620–630, 634, 637; 382/283, 282, 128, 382/130–132; 378/98.2, 98.12
See application file for complete search history.

(56) References Cited

U.S. PATENT DOCUMENTS

| | | | | |
|---|---|---|---|---|
| 4,417,791 A * | 11/1983 | Erland et al. | ..................... | 352/45 |
| 4,709,385 A * | 11/1987 | Pfeiler et al. | ............... | 378/98.12 |
| 4,943,987 A * | 7/1990 | Asahina et al. | ............... | 378/98.5 |
| 4,968,132 A * | 11/1990 | Ferren | .............................. | 352/46 |
| 5,347,622 A * | 9/1994 | Takemoto et al. | ............ | 345/629 |
| 5,353,063 A * | 10/1994 | Yagisawa et al. | ........... | 348/426.1 |
| 5,566,251 A * | 10/1996 | Hanna et al. | ................... | 382/284 |
| 5,940,139 A * | 8/1999 | Smoot | ............................ | 348/584 |
| 6,226,040 B1 * | 5/2001 | Kuo et al. | ..................... | 348/446 |
| 6,229,910 B1 * | 5/2001 | Kaneko | ......................... | 382/128 |
| 6,404,936 B1 * | 6/2002 | Katayama et al. | ............. | 382/283 |
| 6,999,103 B2 * | 2/2006 | Matsumoto et al. | .......... | 345/620 |
| 7,418,131 B2 * | 8/2008 | Wang et al. | ................... | 382/165 |
| 2003/0174253 A1 * | 9/2003 | Ito et al. | ........................ | 348/699 |
| 2003/0231787 A1 * | 12/2003 | Sumi | ............................. | 382/103 |
| 2004/0201753 A1 * | 10/2004 | Kondo et al. | ................. | 348/239 |
| 2005/0238218 A1 * | 10/2005 | Nakamura | .................... | 382/128 |

* cited by examiner

*Primary Examiner* — Victor Kostak
(74) *Attorney, Agent, or Firm* — McAndrews, Held & Malloy, Ltd.

(57) ABSTRACT

A video processing system includes at least one video source, a region selecting unit, a subtracting unit and a display unit. The region-selecting unit selects the user-defined region of interest from the video source. The subtracting unit subtracts the required region, selected by the region selecting unit. The output of the subtracting unit is provided to the display unit, which displays the required output. In one embodiment, when video data is received from a plurality of video sources, the selecting of user defined regions of interest from the video sources is supported. The region subtracting unit can be used to subtract the required region of interest from video data and it is displayed on the display unit. In other embodiments of invention, the display unit displays on overlay of two unrelated video streams.

22 Claims, 8 Drawing Sheets

VIDEO BACKGROUND SUBTRACTOR SYSTEM

CROSS-REFERENCE TO RELATED APPLICATIONS

This application claims priority of U.S. Provisional Patent Application No. 60/731,254, filed on Oct. 31, 2005. The subject matter of this earlier filed application is hereby incorporated by reference.

BACKGROUND OF THE INVENTION

1. Field of the Invention

The present invention relates to real time processing of a video stream.

2. Description of the Related Art

Systems are available in the market which enable users to play back video. Systems are available for broadcasting video programs. However, it is not possible for an end viewer to remove or modify some sections of the video stream being displayed. The user has to view what is delivered in its entirety.

Video sources such as a Set-Top-Box (STB), a Digital Video Disk player (DVD), a Personal Video Recorder (PVR), a computer, or cable/satellite broadcast television, among other sources are often viewed on a television (TV) monitor. The video sources provide a wide variety of programming, both live and pre-recorded, that may be presented on a TV or monitor that a viewer selects. Each of these video sources delivers video to a TV, and is controlled through direct interaction or via a Remote. To interact with a user, video systems deliver information via a TV's screen and speakers and receive information directly from a Remote. Again, such interaction usually requires a user to look back and forth at the Remote and TV Screen in attempts to locate buttons and understand the Remote's operation Different types of video systems are used by a variety of people in environments such as homes, offices, schools (educational institutions) or in public places. People typically view their own programs at their own convenience on these video systems. Similarly, typical home video environment consists of many different members of the family wishing to view their own programs at their own convenience.

Other limitations and deficiencies of the related art can be appreciated by someone with skill in the art through comparison of the related art to the present invention as described in the reminder of this specification and drawing associated herewith.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF THE PREFERRED EMBODIMENT(S)

Figure 1:
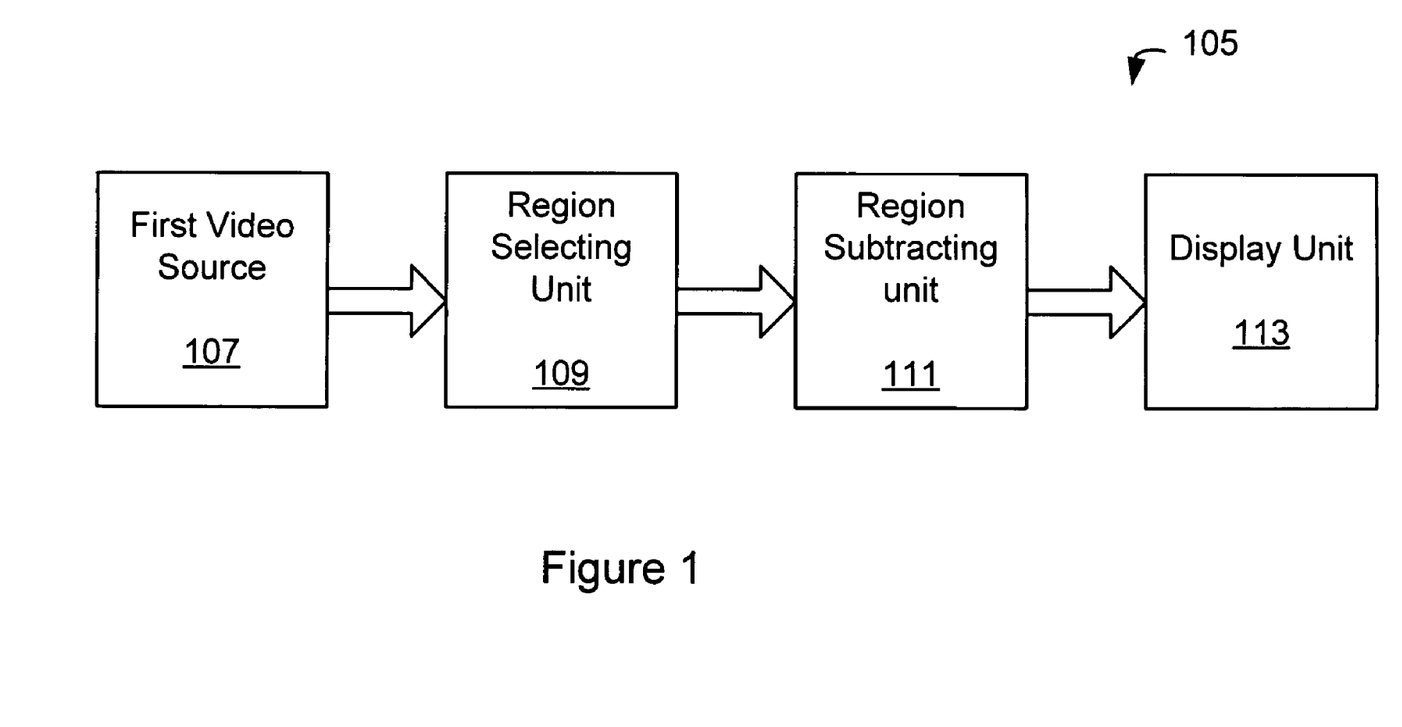
FIG. 1 is a functional block diagram illustrating the operation of a video background subtractor system built in accordance with the present invention.

FIG. 1 is a functional block diagram illustrating the operation of a video background subtractor system built in accordance with the present invention. The video background subtractor system 105 subtracts user defined regions of interest from a specified video stream. The video background subtractor comprises a first video source 107, a region selecting unit 109 communicatively coupled to the first video source 107, a region subtracting unit 111, for subtracting user defined region of interest from the first video source 111. The video background subtractor also comprises a display unit 113 for displaying the subtracted video data is.

The first video source 107 provides a video data for processing by the video background subtractor system 105. The video data that is provided is one of a live TV broadcast from a set-top-box, real-time computer generated video data from a video game, live video from a image capture device, live video from a camcorder, etc. The region selecting unit 109 facilitates selection of a region of interest. For example, it provides identification of a region of interest using an input device such as a touch sensitive screen, a mouse (such as a USB mouse or a wireless mouse), a wireless pointing device, a touch sensitive pad, etc. The region selecting unit 109 makes it possible to identify one or more regions of interest that are communicated to the region subtracting unit 111 for removal from the video data provided by the first video source 107.

The region subtracting unit 111 gathers information on one or more regions to be subtracted from a specified video data. It then subtracts the regions of interest, adjusts boundary, contrast, shading to make the video data compensate for the missing subtracted regions of interest. For example, it replaces the subtracted region of interest with an alternative video data that is computed using neighboring regions of data that may also be specified by a user or pre-defined as the suggested replacement. Thus, the region subtracting unit 111 is capable of replacing the regions of interest that are subtracted, if such replacements are determined to be necessary.

In one embodiment, the video background subtractor system 105 is configured to subtract the background video (i.e. remove the background video) while isolating and retaining the identified regions of interest (ROIs) for subsequent processing, such as incorporation into other video data from another video source.

In one embodiment, the video background subtractor system 105 is incorporated into a video processing system that facilitates processing and enhancements of video data from a plurality of video sources. The video processing system performs video subtraction as well as other kinds of video data enhancements, such as zooming into some regions of interest, or shading the selected region of interest (ROI) differently to highlight it as well as increasing it's relative size before replacing it in the place of the subtracted region of interest.

In one embodiment, when video data is received from a plurality of video sources, the selecting of user defined regions of interest from the video sources is supported. The region subtracting unit can be used to subtract the required region of interest from video data and it is displayed on the display unit. In other embodiments of invention, the display unit displays on overlays ROIs from two unrelated video streams onto a background video data. In another related embodiment, the display unit displays a video data created by an overlay of ROIs.

In general, the video background subtractor system 105 separates a ROI from a background video when a predefined ROI information is provided or when user selection of ROI is employed.

Figure 2:
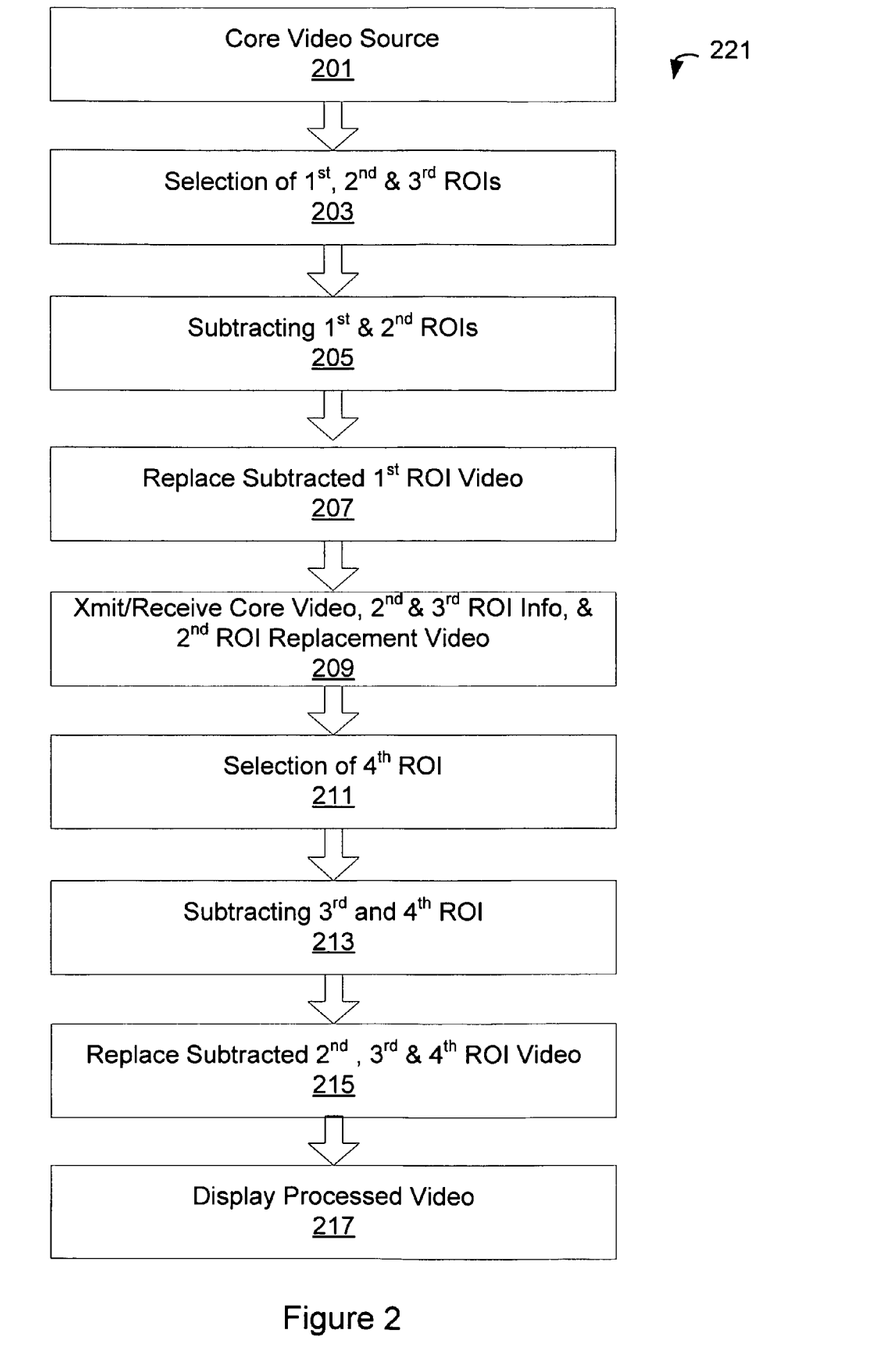
FIG. 2 is a flow chart showing exemplary operation of a video transmission and receiver system wherein the video background subtractor system is employed at both the transmitting and the receiving ends.

FIG. 2 is a flow chart showing exemplary operation of a video transmission and receiver system wherein the video background subtractor system is employed at both the transmitting and the receiving ends. The activities of the video background subtractor system 105 relevant in this description comprises ROI video identification, video subtraction and video replacement. These activities are distributed upstream and downstream (remote and local, transmitting and receiving side). For example, video identification may occur at a cable TV headend system while the video subtraction occurs downstream in a set-top-box, or even in the television (TV).

The video background subtractor system 105 operation in the transmitting side is initiated at a block 201 when a core video source starts providing a video data for processing. The video data from the core video source provides information of ROIs that might be identified in the video data. The core video source is therefore accompanied by ROIs information that may be subsequent modified, removed, replaced or enhanced. Then, at a next block 203, the selection of a $1^{st}$, $2^{nd}$ and $3^{rd}$ ROIs from the ROIs provided by the video data, or provided from another source (such as a local video source) occurs. At a next block 205, the $1^{st}$ and $2^{nd}$ ROIs are subtracted. Then, at a next block 207, the subtracted $1^{st}$ ROI is replaced in the video data. Such replacements is performed using an enhanced video object created from the replaced $1^{st}$ ROI, using a computed video information (computed using other ROIs or from video segments in a background determined to be relevant) or using additional ROIs obtained from other sources.

After the replacement, at a next block 209, in the case of a video broadcast environment or a video origination system, such as a cable TV headend system, the core video and the ROI information, such as the $2^{nd}$ and $3^{rd}$ ROI information is communicated to video systems that are "listening", i.e. to video systems that are capable of receiving the transmitted video information. In one embodiment, the video background subtractor system 105 communicates ROI information to the recipient video systems that are capable of processing the ROIs and conducting replacements and overlays on the video data from the core video source employing the ROIs. In another embodiment, the video background subtractor system 105 conducts subtraction itself as a source of video data for a remote recipient video system and communicates video data from the core video source modified by the subtraction of the ROIs, such as the $1^{st}$ ROI, but it communicates the $2^{nd}$ and $3^{rd}$ ROI information associated with ROI replacement and overlay.

At the block 209, in the case of a recipient video system that comprises the video background subtractor system 105, the received core video may comprise ROIs and ROI information, such as the $2^{nd}$ and $3^{rd}$ ROI information. In addition, it receives replacement video for replacing the $2^{nd}$ ROI. Being capable of subtraction of ROIs, it subtracts the $2^{nd}$ ROI and replaces it with the replacement video received.

At a next block 211, the recipient video system comprising the video background subtractor system 105 selects a $4^{th}$ ROI. This is supported using pre-configured video selection information or by user initiated selection operation employing input devices. Then, at a next block 213, the $3^{rd}$ and $4^{th}$ ROI are subtracted. Then, at a next block 215, the $2^{nd}$, $3^{rd}$ and $4^{th}$ ROI are replaced by appropriate replacement video (which may be enhanced version of the ROIs themselves). Finally, the processed video that emerges as a combined output is displayed on the display unit.

Figure 3:
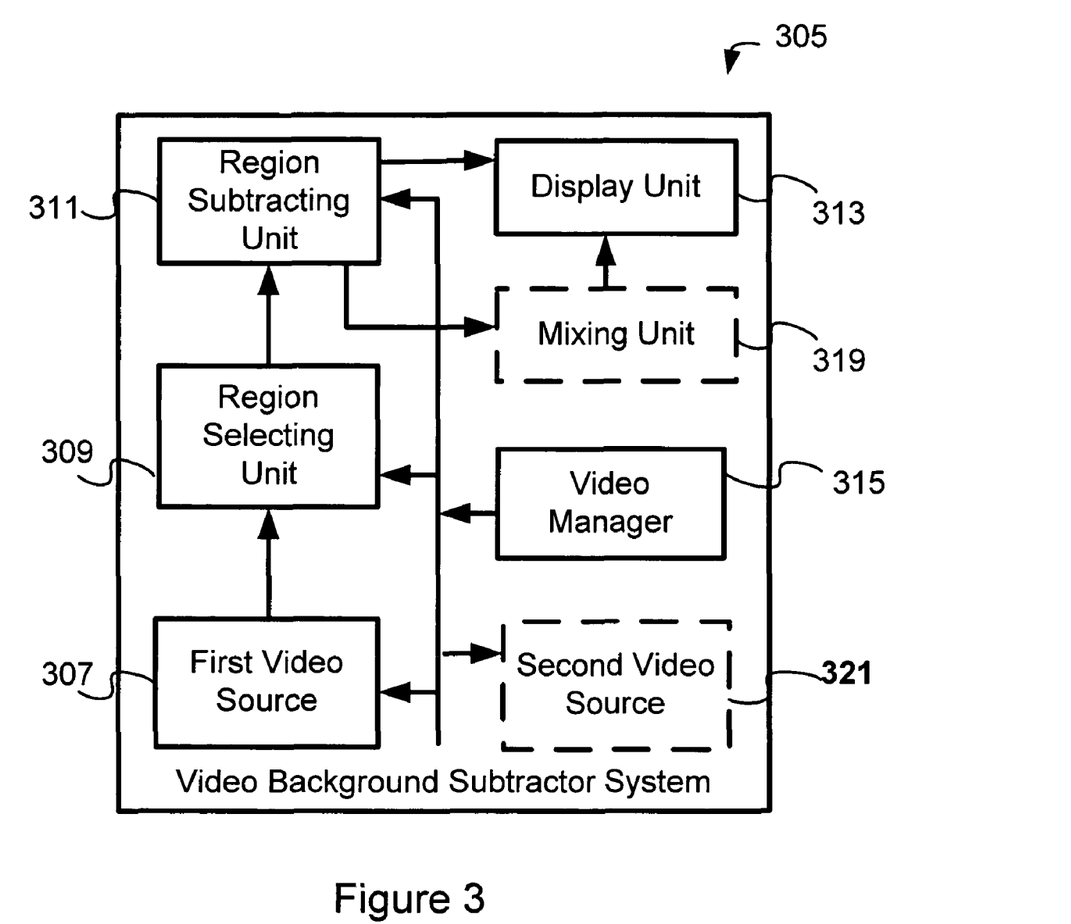
FIG. 3 is a schematic block diagram illustrating one embodiment of a video background subtractor system in accordance with the present invention.

FIG. 3 is a schematic block diagram illustrating one embodiment of a video background subtractor system 105 in accordance with the present invention. The system 105 comprises a first video source 307, a region selecting unit 309 communicatively coupled to the video source, and a region subtracting unit 311. The video background subtractor system 105 also may comprise a mixing unit 319, a second video source 321, and a video manager 315.

The region selecting unit 309 provides input (user input or predefined configuration information) to the region subtracting unit 311, the output of which is connected to the display unit 313. The region selecting unit 309 is configured to select a particular region of interest from the video source 307, for example based upon input from a user. For operation in real time environment, a user can select the region of interest from the video source while real-time video is being fed to the selecting unit 309. Utilizing such conventional input and control devices such as keyboard, mouse, wireless pointing device, a tablet, a touch screen etc., appropriate parameters are provided, as part of a selection operation to the video background subtractor system 105 that can be used during region selection by the region selecting unit 109.

The appropriate regions of interest are selected based upon appropriate locating methods such as coordinates in an area of a screen, by estimation of motion vector, block matching technique and by a sum of square difference method and similar region selection techniques. The selection of a predefined object, whether it is dynamic or static, is based upon predefined characteristics of the object. Software or hardware can be configured within region selecting unit 309 to track or to follow a dynamic region of interest, such as a talking person, a moving person or moving objects such as a condenser, a racing car or virtually any other moving device. The subtracting unit 311 can be configured to subtract a selected region from the video data provided via the video source, such as the first video source 307 or the second video source 321.

In one embodiment, a mixing unit 319 is incorporated into the video processing system 305, and is configured to add information from different video layers, which form the output, after removing one or more selected regions of interest from the video stream provided by the first video source 307. Through the use of an image tracking unit provided in either the region selecting unit 309 or the mixing unit 119, a moving object can be tracked from the video data from the video source 307, 321. Software and hardware are provided that can adjust the borders of selected region to be removed by the region subtracting unit 311. Further, the mixing unit according to certain embodiments of the present invention can apply various transforms to the region of interests before the different video layers are added together.

In certain embodiments of the present invention, the display unit 313 can be in visual proximity of a viewer viewing the video program, provided as the first video source 307 that is currently displayed on the display unit 113. The video program can be, for example, a background scene, a motion picture scene, a video game, etc. The viewer whose subsequent actions, in response to the video program being displayed is captured as a second video source 321 and communicated to the mixing unit 319. The video program provided from the first video source 307 is then processed by the region subtracting unit 311 to remove a ROI associated with a primary character in the video stream (program being displayed or game being played) and the mixing unit 319 adds in the viewer's image retrieved as an ROI from the video stream captured from the second video source 321 to create an output that is displayed on the display unit 313. Such an output is thus been created by subtracting a region of interest from the first video source 307 and by adding, as a replacement operation, the image of the viewer that is provided in the video stream provided by the second video source 321.

In one embodiment, the region selecting unit 309 and the mixing unit 319 is merged into a single component. In another embodiment, the mixing unit 119 is not employed and the output of the region subtracting unit 311, which is the video data received from the first video source 307 without the ROIs selected, is displayed on the display unit.

The video data from the video source 307/321 may comprise of a static background with an image of a dynamic object moving on the foreground. Other examples of video data are more motion picture video, video of a martial art display, video games etc. Various video recording can be stored in a video library and accessed by users for various applications and the video sources are used to provide such input. The mixing unit 319, if needed, is configured to mix various video layers from the different video inputs, based upon specified parameters, which can be preset by a user.

In one embodiment, an image-tracking unit is incorporated into the region selecting unit 309, such that tracking of dynamic object in the video input from a real time video source becomes possible. It is possible to provide video data, such as video streams or static video objects, from the second video source 121, 321 or even a third video source and enable tracking of specific objects, or ROIs. Image tracking by the image tracking unit, and in addition, a border adjustment by a border adjusting unit 207, that are both configurable, is supported by the region selecting unit 309 in one embodiment.

In certain embodiments of the invention, the first video source 307 might be prerecorded static background scene or live video, providing a video data from a remote location. It is also possible for the video source 321 to be provided from (a stored video) from a video library. Selection of an image from one of the video source 307, 321 is supported, for example, with a keyboard, mouse or wireless remote control.

Selection of region of interest within a selected image is conducted within the region selecting unit 109, either by manually or automatically by highlighting a region of interest. In one related embodiment, the first video source 307 is prerecorded and the regions of interest are selected within region selecting unit 309 appropriately.

In another embodiment, the first video source 307 is a live feed from a video camera, wherein the region selecting unit 309 selects certain aspects of the live feed, and the subtracting unit 311 deletes or subtracts the selected regions of interest (there can be more than one selected or specified). The output from the region subtracting unit 311 is ultimately displayed on a display unit 313.

In another embodiment of the present invention, the video sources 307, 321 comprise a video camera, the video data collected is processed such that a background is deleted and just a region of interest is retained. The video output is displayed on the display unit 313, saved for sharing, or broadcast to other remote video systems.

In another embodiment of the present invention, a video source 307 provides video with multiple moving objects and background scene. The video background subtractor system 305 also comprises of a storage unit and the mixing unit 319. The storage unit is required for storing video layers created from the ROI extracted from the input video from the video source 307. The multiple moving objects are removed by a step-by-step processing technique thereby forming different layers of video data, with each video layer storing one specific moving object. It is then possible to remove, or replace, one moving object while retaining the others if necessary—the region subtracting unit 311 is used for such removal of moving objects and the mixing unit 319 being used for replacement, if needed. In addition, a moving object having a higher motion or dominant motion may be removed and even replaced, while retaining other moving objects in the video data from the video source 307. It could also be confined or captured in its own individual video layer.

In one embodiment, a moving object in the input video data from the first video source 307, with the highest motion parameters or dominant motion parameters is removed and other moving objects having other types of motion characteristics, perhaps slower, are retained and saved as part of a video layer. If more than one object has the same unwanted motion, then these objects can be removed simultaneously. The resulting video may be separated into a second video layer, and so on. Thus, these resulting video for the individual moving objects, or sets of moving objects, can be formed into forms different video layers, and saved as separate video layers, and subsequently communicated as different video layers. All the video layers may be subsequently combined in the mixing unit 319 to get the required output, wherein all the moving objects having different motion may be removed or otherwise manipulated. The output of mixing unit is communicated to display unit 313 for display.

In one embodiment, the region selecting unit 309 and region subtracting unit 311 might be configured within a resolution adjusting capability, wherein the right resolution is employed for certain regions, as appropriate. For example, in the situations where a video source, such as the first video source 307, may be a combination of video from multiple spectral bands, such as video created by combining visible band data and thermal IR band data, each band of video images may be captured in a different layer, and different resolution technique may be applied to the different layers. In addition, one of the layers may be completely subtracted. Again, at least a portion of an image in one spectral band (layer) may be subtracted, and the resulting layers are combined to created an output video stream that is displayed on the display unit 319. The resolution of the different types of video data, in the different layers or spectral bands, can be adjusted as necessary. In some implementation, it might be desirable to adjust the resolution of the subtracted region depending upon the user.

Figure 4:
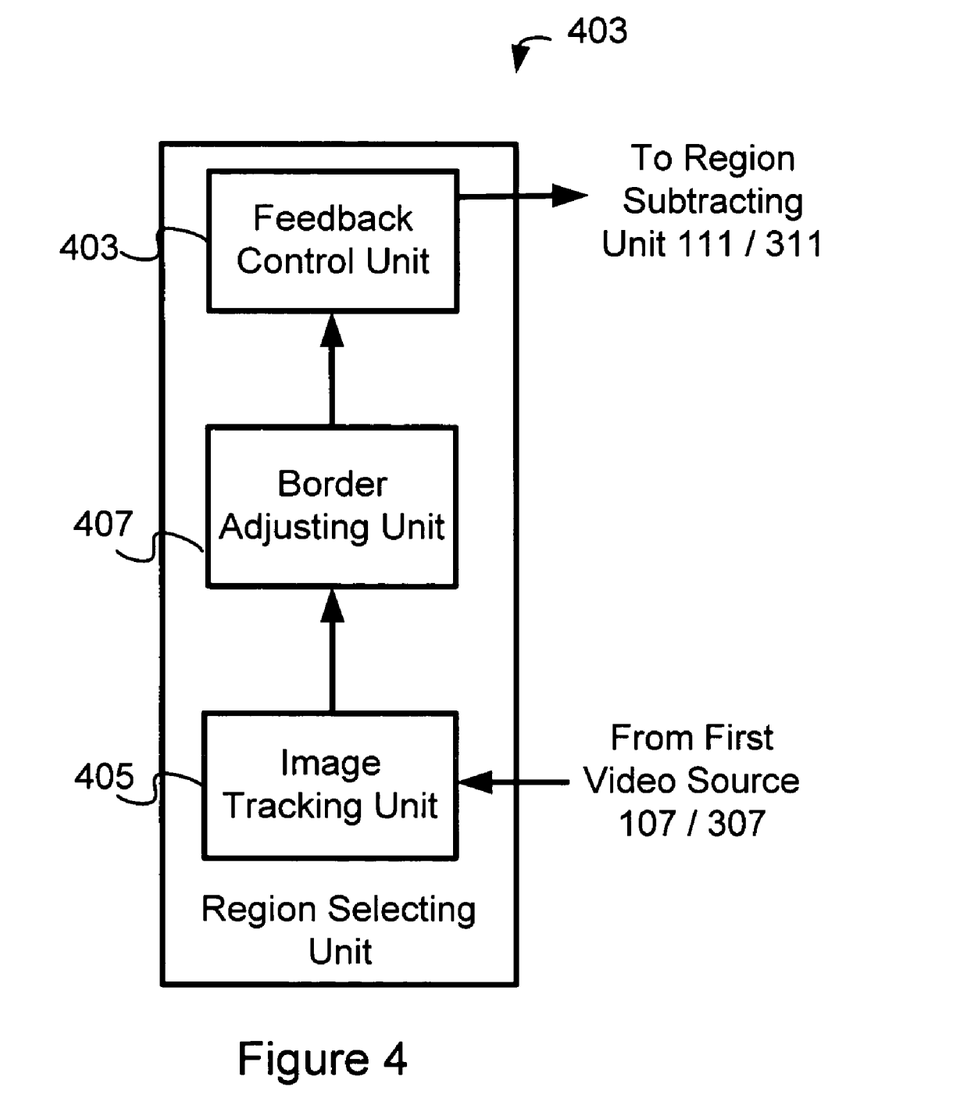
FIG. 4 is a schematic block diagram that illustrates an exemplary embodiment of a region selecting unit that acts as a control unit of an exemplary video background subtractor system.

FIG. 4 is a schematic block diagram that illustrates an exemplary embodiment of a region selecting unit 403 that acts as a control unit of an exemplary video background subtractor system. The region selecting unit 403 comprises an image tracking unit 405, a border adjusting unit 407 and a feedback control unit 409. It should be noted that these elements provided in are just one embodiment of a control unit. Other embodiments are contemplated wherein these elements are provided as part of a video manager 315, as part of the region selecting unit 309 or the mixing unit 319.

The image-tracking unit 405 receives a video stream from a video source, such as the first video source 307. In one embodiment, the video stream is received after the region subtracting unit 311 has processed it. The image tracking unit 305 is configured to track a dynamic image such as talking person, a moving vehicle, a dancer in a video program of a dance, etc. Replacement of a tracked image is supported by the region subtracting unit 311 after it has been tracked by the image tracking unit 405 and its border has been defined by the border adjusting unit 407. The borders may be adjusted to make the selected ROI blend better with a new background, make the ROI more distinct from the background, or to extract the ROI out of the background.

In one embodiment addressing the broadcast of a video program of a sporting event, such as a tennis match, the background is considered as static and the player is considered to be a moving region of interest. Thus, the tennis player moves on a background that is quite static, and in the image on the display unit, the tennis player is seen as moving around on the screen. The image of the tennis layer is tracked and the tracked image or image data is provided by the image tracking unit 405 to with border adjusting unit 407. The border adjusting unit 407 may be configured to adjust or "soften" the borders of the selected region of interest. The border adjustment is implemented in hardware, in software or in combination of the two.

The output of border adjusting unit 407 is provided, in certain embodiments, to a feedback control unit 409, that also receives the feedback from the display unit 313 in addition to the video source, such as via the second video source 121. This enables real-time adjustment in any image tracking or border adjusting. The feedback control is not necessary in all embodiments.

Figure 5:
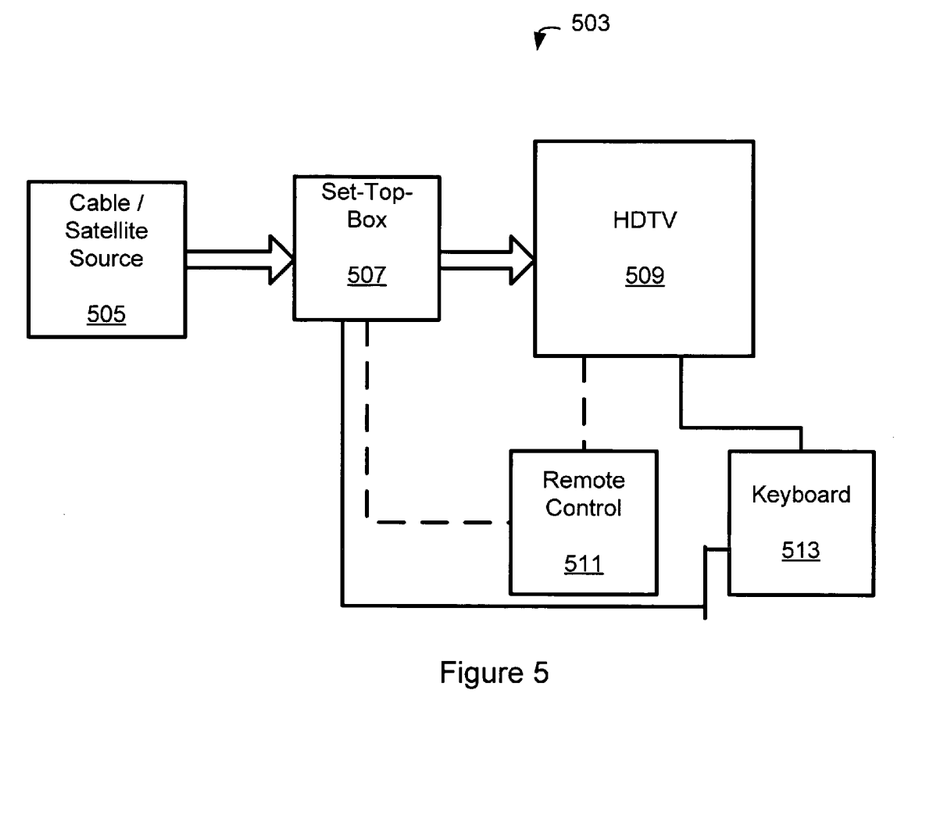
FIG. 5 is a functional block diagram of a video processing system wherein the video subtracting system used to subtract a region of interest from a video data, such as a cable/satellite source, is incorporated into a set-top-box (STB) or into a television, such as the HDTV.

FIG. 5 is a functional block diagram of a video processing system 503 wherein the video subtracting system used to subtract a region of interest from a video data, such as a cable/satellite source 505, is incorporated into a set-top-box (STB) 507 or into a television, such as the HDTV 509. The cable/satellite source 505 provides video data such as movies, broadcast programs, etc. for reception by the STB 507 and/or the HDTV 509.

In one embodiment of the invention, the system 503 comprises a first video source from cable/satellite link 405, which is communicatively coupled to set-top-box 507. The signal from set-top-box 507 is delivered to HDTV 509 and displayed on the full 4 corners of the screen of the HDTV 509, a remote control 511 and keyboard 513 being used to select, size and locate regions of interest in the center of the screen. The HDTV 509, in a related embodiment, is capable of supporting the subtraction of regions of interest using a video background subtraction system incorporated into the HDTV 509. In another related embodiment, the STB 507 is capable of supporting the subtraction of regions of interest using a video background subtraction system incorporated into the STB 507.

A second video source, if required, can be obtained from the set-top-box 507 that supports multiple video sources, including video data broadcast from the cable/satellite source 505. For example, in an application for tracking the dynamic activity of a tennis player in the game of tennis that is broadcast, the video data stream consists of a relatively static background and moving objects such as the tennis player. An image tracking unit provided with the selecting unit of a video background subtractor system (incorporated into the STB 507, for example) is used to track the dynamic activity of tennis players. After selecting dynamic activity of the tennis player, the STB 507, or the HDTV 509 (as the case might be) then applies a subtraction function, i.e., performs subtraction to generate a resulting video stream bounded by the dynamic activity of tennis player. The subtracted video stream that comprises dynamic motion and activity of the tennis player can be displayed on the HDTV 509 at different resolution, or with a different background, depending upon user requirement or preferences. Replace by an enhanced image, which may be derived from the subtracted image/object.

Another example of a video processing system in image montage preparation. Image montage or a mosaic image overcomes the limitations of the limited field of view of a camera, by aligning and pasting frames in a video sequence. Since a camera's field of view is always smaller then human field of view. In order to capture the entire scene, a number of images can be captured and combined into a single image having large field of view. In this case, for combining the two images, motion parameters between the images must be found and tracked. However, in most practical situations the motion field is not homogeneous as there may be several objects undergoing different motions. Moving objects can bias estimation of motion parameters because moving region of the image indicates a transformation different than the transformation due to the camera. Therefore these moving objects have to be removed or otherwise neutralized. The image tracking unit of the selecting unit component of the video background subtractor system, that is part of the STB 507, and, in some embodiments, in the HDTV 509, is used to track the moving objects. After a viewer selects moving objects, or based on predefined selections of moving objects, the HDTV 509 then applies a subtraction function, performs subtraction to generate a resulting video stream bounded by the background, where background is static. The subtracted images (background images) are aligned and they are combined to form an image with a larger field of view, and displayed on HDTV at different resolution depending upon user preferences.

Figure 6:
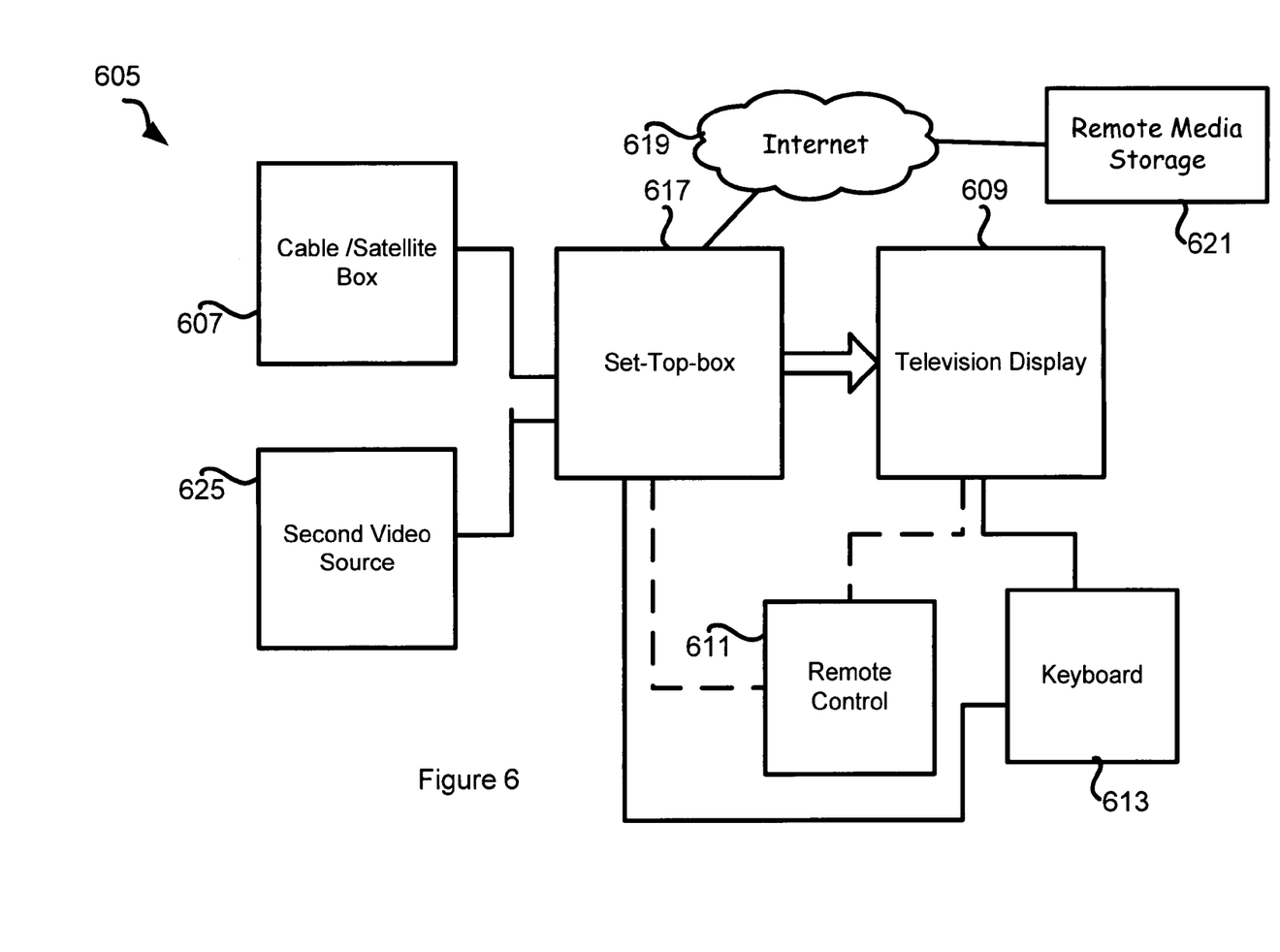
FIG. 6 is a functional block diagram illustrating use of video processing system for overlaying two pure unrelated video streams, wherein a set-top-box (STB) or a television (TV) display comprises a video background subtractor system and wherein a user can specify a region of interest using a remote control or keyboard.

FIG. 6 is a functional block diagram illustrating use of video processing system for overlaying two pure unrelated video streams, wherein a set-top-box (STB) 617 or a television (TV) display comprises a video background subtractor system and wherein a user can specify a region of interest using a remote control or keyboard. The video processing system 605 comprises a cable/satellite broadcasting connection (interface) 607 that behaves as a first video source, a second video source 627, the STB 617, the TV 609, a remote control 611 and a keyboard 613. It also comprises an interface to the Internet 619 and a remote media storage 621.

A live feed video streams from the cable/satellite box 605 is received by the STB 617. The video data transmitted from the satellite or a cable TV connection is provided to the STB 617. The STB delivers it to the television 609, which is an HDTV 609 in one embodiment. The received satellite or a cable TV programs are typically displayed on the full 4 corners of the screen of the TV 609. The remote control 611 and keyboard 613 are associated with the HDTV 609, or with the set-top-box 617, and they are used to program channels, as well as to select, a size and locate a region of interest on the screen. The region of interest could be shaped in a number of geometrical shapes—circular, oval, rectangular, heart shaped or any other region based on user preferences.

In one embodiment, after a user selection of a region of interest, TV 609 applies a subtracting function, performs subtraction to generate a resulting video stream bounded by the region of interest. This resulting video stream is overlayed on to another video stream, if necessary. For example, a first video data received through the cable/satellite broadcasting connection 607 can be a data presented in a region that is shaped like a heart, for example, while a video program from the second video source 625, 621 is being displayed on the TV 609. Thus, a region of interest containing dynamic video data from cable/satellite broadcasting connection 607 is combined with video data from the second video source 625, 621, and the region of interest displayed is shaped like a heart. The position of the region of interest can be manipulated—it could be at the center of the TC 609 screen, or moved to a side, for example.

The second video source 625 could be a stored data in the video library or a remote media storage 621 that is linked to the TV 609 screen via the Internet 619. The second video source 625, for example, may be a static data that needs to be enhanced with a dynamic data. To enhance the static video data of the second video source with a dynamic content from the cable/satellite broadcasting connection 607, the remote control 611 is used to select, size and locate the heart shape to a particular position on the TV 609 screen.

An exemplary process of selection of a ROI involves selection a geometrical shape, such as a heart shape or a rectangle while the first video data from the cable/satellite broadcasting connection 607 is being viewed, such selection being conducted with a remote control or a keyboard. When a viewer selects a large heart shaped region of interest from the first source, the TV 609 then applies a subtraction function, performs subtraction to generate a resulting video stream bounded by the heart shape. This heart shaped subtracted region from the first video source is then overlayed on the second video source selected by the viewer, and the combined output is displayed on the TV 609 screen.

Figure 7:
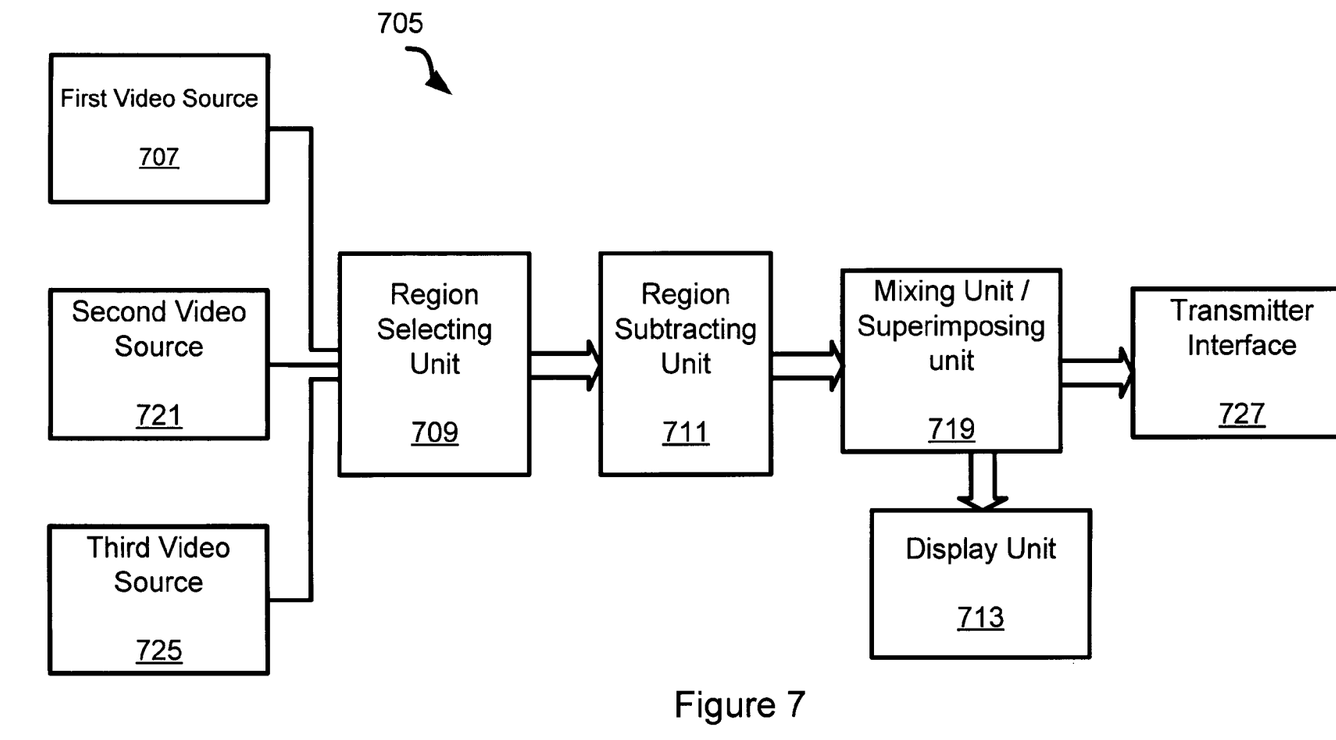
FIG. 7 is a schematic block diagram showing an exemplary video background subtractor system that is used for transmitting a composite video signal incorporating a plurality of video sources.

FIG. 7 is a schematic block diagram showing an exemplary video background subtractor system 705 that is used for transmitting a composite video signal incorporating a plurality of video sources 707, 721, 725. The video background subtractor system 705 comprises a region selecting unit 709 to which multiple video sources are communicatively coupled, such as a first video source 707, a second video source 721 and a third video source 725. The video background subtractor system 705 also comprises a mixing/superimposing unit 719 that is capable of combining ROIs from one or more sources into a composite output. The mixing/superimposing unit 719 is also capable of combining ROIs with video data from one of the video sources, such as the first video source 707. The output from the mixing/superimposing unit 719 is either displayed on a display unit 713, stored locally or remotely, or transmitted via a transmitting interface 727.

In one embodiment, for example, for certain types of broadcast video implementations, the output of the video background subtractor system 705 is a transmitted video signal, which is ultimately displayed on a remote display unit, such as 713. A live telecast of a conversation between two users could comprise a first video source 707 containing the image or video data of a first speaker, a second video source 721 containing an image or a video data of a second speaker, and a third video source 725 could be a video data associated with a stage or studio background. The selected regions of interest from first video source 707 is a ROI around the image of the first speaker, the selected region of interest from the second video source 121 is an ROI around the image of the second speaker. The selecting unit 709 is used to select the ROIs with the images of the first and second speakers, and the background is selected from the third video source 725. A region subtracting unit 711 is used to generate the necessary ROI with the first and the second speakers from the associated video sources after the selection of the ROI. The mixing unit/superimposing unit 719 is used to create a composite output. Before the composite output can be transmitted or displayed, there is a need to apply shading control, and contrast/border adjustment to the images. This is provided by the region subtracting unit 719 in a related embodiment. The mixing unit/superimposing unit 719 place the images in the appropriate locations in the appropriate video source that forms the background, and composite output, that would then be received by users or viewers at remote destinations, is transmitted via the transmitter interface 727. The net result on the composite output is the seamless juxtaposition of the images of the two speakers on a required third background with the expected impression on the viewers being that the speakers are next to each other in close proximity. In fact, it would appear to the viewers that the two speakers were in the same room or the same studio, having a face-to-face conversation, even though they could, in reality, be actually in remote locations miles apart. A fourth or fifth video source could be provided, as necessary, which could provide images of a moderator, or other scenes or other individual participants of an event.

Figure 8:
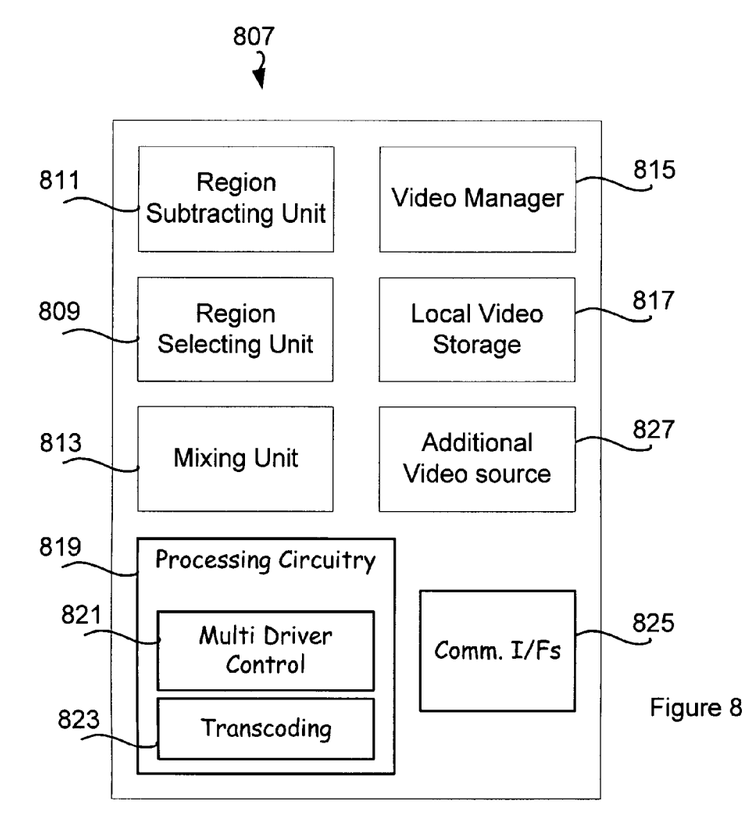
FIG. 8 is a schematic block diagram that illustrates an exemplary embodiment of a set-top-box that comprises the typical components of the video background subtraction system, such as a region selecting unit, a region subtraction unit, a mixing unit.

FIG. 8 is a schematic block diagram that illustrates an exemplary embodiment of a set-top-box 807 that comprises the typical components of the video background subtraction system, such as a region selecting unit 809, a region subtraction unit 811, a mixing unit 813. The STB 807 also comprises a video manager 815 and local video storage 817 and an additional video source 827, in addition to typical STB components such as a processing circuitry 819 and a communication interface 825. The processing circuitry 819 comprises a multi-driver control 821 and a transcoding component 823.

For operation in a real time environment, a user using a remote control or the set-top-box 807 based on a configuration information can select the region of interest from the video source while the video data is being provided to the region selecting unit 809. Utilizing conventional input and control devices such as keyboard, remote control, a user can control the region selecting unit 809. The regions of interest, when selected, are specified or captured in terms of coordinates in the areas of a screen, vectors, etc. The region of interest can also be selected employing predefined objects representing ROIs. Such predefined ROI specification can be used for processing both static or dynamic video data. In addition, the region selecting unit 809 can be configured to track or to follow a dynamic region of interest, such as a talking person, a moving person, etc. The mixing unit 813 can be configured to mix the region of interest from the video source such as the video data from a cable or satellite connection, with the video data obtained from the local video storage 817 or from the additional video source 827. The mixing unit 813 can also be configured to superimpose information from the cable or satellite connection on to video data from the local video storage 817 or from the additional video source 827. One example of such superimposition might be the utilization of ROIs derived from the video data provided by cable/satellite connection in creating a combined output wherein these ROIs are superimposed upon a background scene obtained from the additional video source 827. The background scene can be a mountain scene or a studio scene, obtained from the additional video source 827. In this case the required region of interest from the video data provided by cable/satellite connection is separated from it's background using background subtraction techniques. Then the required region of interest are superimposed using the mixing unit 813 onto a new background scene obtained from the additional video source 827. The superimposed video output is displayed on a TV or stored in the local video storage 817.

While the present invention has been described with reference to certain embodiments, it will be understood by those skilled in the art that various changes can be made and equivalent may be substituted without departing from the scope of the present invention. In addition many modifications may be made to adopt a particular situation or material to the teachings of present invention without departing from its scope. Therefore, it is intended that the present invention not be limited to particular embodiment disclosed, but that the present invention which include all embodiments following within the scope of the appended claims.

We claim:

1. A video background subtractor system comprising:
    a first video source that provides a first video data that comprises a first background;
    a region selecting unit communicatively coupled to the first video source for selecting a first region of interest from the first video data and distinguishing it from the first background;
    a region subtracting unit communicatively coupled to the region selecting unit for subtracting the first region of interest from the first video data to create a first output comprising the first background; and
    the region subtracting unit subtracting the first background from the first video data to create a second output comprising the first region of interest; and
    wherein the first video data comprises a plurality of layers of video data, wherein each of said plurality of layers corresponds to different ones of a corresponding plurality of moving objects, and wherein the region selecting unit selects the first region of interest in one of the plurality of layers; and
    the region subtracting unit subtracting the first region of interest from the first video data.

2. The video background subtractor system of claim 1, further comprising:
    a second video source that provides a second video data; and
    a mixing unit that replaces the first region of interest with at least a portion of the second video data to create a combined output.

3. The video background subtractor system of claim 2, further comprising:
    a mixing unit capable of mixing at least a portion of the first video data with at least a portion of the second video data to create a combined output;
    the mixing unit superimposing the second output onto the second video data to create a combined output.

4. The video background subtractor system of claim 1, further comprising:
    a second video source that provides a second video data, the second video data comprising a second background;
    the region selecting unit communicatively coupled to the second video source selecting a second region of interest from the second video data and distinguishing it from a second background;
    the region subtracting unit subtracting the second region of interest from the second video data to create a second output comprising the second background.

5. The video background subtractor system of claim 4, further comprising:
    the video background subtractor system providing a composite output comprising the first region of interest, the second region of interest and at least one of the first background and the second background.

6. The video background subtractor system of claim 5, wherein the video background subtractor system provides a composite output comprising the first region of interest and the second region of interest.

7. The video background subtractor system of claim 1, further comprising:
    an input device that is one of a remote control, a mouse and a keyboard for the selection of the user selected region of interest by a viewer;
    the region subtracting unit selecting the user selected region of interest from the first video data and distinguishing it from the first background.

8. The video background subtractor system of claim 1, wherein, the region selecting unit selects a plurality of regions of interest from the plurality of layers of video data; and
    the region subtracting unit subtracts at least one of a plurality of regions of interest in the at least one of the plurality of layers of video data to create the combined output.

9. The video background subtractor system according to claim 8, further comprising a mixing unit coupled to the region subtracting unit, the region subtracting unit subtracting at least one of a plurality of regions of interest and the mixing unit mixing the others of the plurality of layers of video data to create a combined output.

10. A video processing system for subtracting a region of interest from an input video data obtained from a first video source, the video processing system comprising:
    the first video source that provides the input video data;
    a region selecting unit communicatively coupled to the first video source for selecting a first region of interest from the input video data and distinguishing it from a first background;
    a region subtracting unit communicatively coupled to the region selecting unit for subtracting the first region of interest from the input video data to create a first output comprising the first background; and
    the region subtracting unit subtracting the first background from the first video data to create a second output comprising the first region of interest; and
    wherein the first video data comprises a plurality of layers of video data, wherein each of said plurality of layers corresponds to different ones of a corresponding plurality of moving objects, and wherein the region selecting unit selects the first region of interest in one of the plurality of layers; and
    the region subtracting unit subtracting the first region of interest from the first video data.

11. The video processing system of claim 10, wherein the first region of interest is dynamic, the video processing system further comprising:
    an image tracking unit for tracking the first region of interest in the input video data from the first video source wherein the image tracking unit is communicatively coupled to the region subtracting unit.

12. The video processing system of claim 11, further comprising:
    a border-adjusting unit connected to the region subtracting unit for adjusting the borders of a region of interest when it is selected for display on a display unit.

13. The video processing system of claim 12, further comprising:
a feedback control unit for adjusting the at least one of the first output and the second output that is displayed on the display unit.

14. The video processing system of claim 10, wherein the first video source comprises a live feed from an image capture device.

15. The video processing system recited in claim 10, wherein the first video source comprises a live feed from a remote location.

16. The video processing system recited in claim 10, wherein the input video data comprises a relatively static background with multiple moving objects, each of the multiple moving objects being selected as a region of interest, at least one of which is replaced or subtracted by the region subtracting unit to generate the first output.

17. The video processing system recited in claim 10, wherein the region selecting unit employs an input device for the specification of the region of interest by a viewer, the input device being one of a keyboard, a mouse, a remote pointing device, a tablet and a touch screen.

18. The video processing system recited in claim 10, wherein the input video data comprises one or more moving objects, each of the objects being selected as a region of interest, at least one of which is replaced or subtracted by the region subtracting unit to generate the first output.

19. The video processing system recited in claim 17, wherein one or more objects may be combined to form the region of interest.

20. The video processing system recited in claim 10, wherein it is capable of transmitting the region of interests in different layers.

21. A method of operating video processing system, the method comprising:
receiving a first video data from a first video source;
selecting, a region of interest from the first video data;
subtracting the selected region of interest from the first video data to create a modified first video data; and
displaying the modified first video data as output; and
wherein the first video data comprises a plurality of layers of video data, wherein each of said plurality of layers corresponds to different ones of a corresponding plurality of moving objects, and wherein the region selecting unit selects the first region of interest in one of the plurality of layers.

22. The method recited in claim 21, wherein the first video source is one of an image capture device, a cable TV broadcast connection, a satellite TV broadcast, a video game input and a prerecorded video clip from a local storage.

* * * * *